United States Patent [19]

Johnson, Sr.

[11] Patent Number: 4,758,338

[45] Date of Patent: Jul. 19, 1988

[54] OIL REFINER AND FILTER COMPACTING SYSTEM

[76] Inventor: Lester L. Johnson, Sr., 5181 River Bluff La., Jacksonville, Fla. 32211

[21] Appl. No.: 944,968

[22] Filed: Dec. 22, 1986

[51] Int. Cl.$^4$ .......................................... B01D 35/30
[52] U.S. Cl. ................................. 210/168; 210/238; 210/350; 210/436; 210/472
[58] Field of Search ............... 210/162, 168, 180, 184, 210/237, 238, 350, 351, 436, 448, 452, 455, 471, 472

[56] References Cited

U.S. PATENT DOCUMENTS

| | | |
|---|---|---|
| 4,093,548 | 6/1978 | Sterkenburg et al. ............... 210/180 |
| 4,289,583 | 9/1981 | Engel ................................... 210/180 |
| 4,295,966 | 10/1981 | Le Blanc et al. ................... 210/184 |
| 4,337,119 | 6/1982 | Donahue ............................. 210/184 |
| 4,349,438 | 9/1982 | Sims ................................... 210/180 |
| 4,443,334 | 4/1984 | Shugarman et al. ................ 210/168 |

Primary Examiner—Richard V. Fisher
Assistant Examiner—Richard D. Jordan
Attorney, Agent, or Firm—Arthur G. Yeager

[57] ABSTRACT

An oil reconditioning device includes a housing with a tightenable lid, a smooth walled chamber in the housing containing a compressible filter, a hollow, convex frustoconical element in the upper portion of the chamber having a plurality of upstanding columns for engagement by the lid when it is being tightened and firmly secured to the housing to cause increasingly a compressive force to uniformly compact the filter. The compacted filter rests on a horizontal conduit having a centrally located termination in the form of a vertical nozzle with laterally directed passages to direct oil laterally into a cavity formed in the lower surface of the filter. A small space below the filter and the bottom of the housing is connected to an outlet from which water may be drained.

20 Claims, 2 Drawing Sheets

OIL REFINER AND FILTER COMPACTING SYSTEM

BACKGROUND OF THE INVENTION

1. Field of the Invention

The present invention pertains to the field of oil reconditioning devices and particularly to oil filters and the associated closure mechanisms.

2. Prior Art

There are a number of oil reconditioning devices known to the prior art. With specific reference to oil reconditioning devices for continuous use in a lubricating oil system, the general approach is to pass contaminated oil into a filter chamber containing filters made of cotton or similar material. After the contaminants are removed, the purified oil is directed out of the device. Prior to leaving the oil reconditioning device, the oil may be subjected to heating in order to vaporize contaminants such as water. A venting or vacuum exhaust system may be attached near the outlet to carry away vaporized impurities.

An important element in the design of oil filtering systems is the need to ensure that oil flows through the filters rather than around them near the filter chamber wall. In oil reconditioning device design, therefore, there is a need to apply downward force on the filters thus compressing them in a manner that causes them not only to press tightly against the interior wall of the housing but to compress them to inhibit "channelling" through the filter. In addition, oil is usually introduced into the filter chamber at a point to force it through the filters. Oil exits the filters through a dispersion plate having small holes or passages and into an evaporation chamber and then out of the device. The oil reconditioning devices in the prior art employ a variety of means to apply downward force to the dispersion plate in an attempt to obtain proper compression of the filters. As a general proposition, the means for forcing the dispersion plate downward involves pressure directed at the perimeter of the plate, or pressure directed at the center or a combination of the two. See U.S. Pat. Nos. 2,110,124 (Fitz Gerald); 2,173,631 (Niedens); 2,206,358 (Koinzan); 2,274,132 (Ehlers); 2,346,042 (Morris); 2,377,988 (Braun); 2,909,284 (Watkins); 3,616,885 (Priest); 3,915,860 (Priest); 4,006,084 (Priest); and 4,338,189 (Johnson). Fins may also be used to apply downward pressure to the dispersion plate, see U.S. Pat. No. 2,206,358 (Koinzan).

While the above described devices have adequate securing means, a more desirable approach is to apply downward pressure on the filters via the dispersion plate at a point between the center and the perimeter. A force applied in this manner will tend to push outwardly as well as downwardly thus providing a tighter fit. The approach, however, can not only result in an increase in the number of components involved thus adding expense as well as weight to the device, but also may interfere with the vaporization process used to remove water and similar contaminants. Also, it is important that the filter compacting apparatus be easy to use because of the need to change filters periodically. Some of the prior art requires a tool to compress the plate against the filter and then turn the plate to lock beneath internal lugs.

It is an object of the present invention to provide an improved oil reconditioning device which provides a filter compacting and positioning system that results in less oil bypassing the filtration process as well as a better means to remove water and other contaminants. A further object is to provide an improved oil reconditioning device that is lighter in weight and less expensive in construction than prior devices. A specific object is to provide an oil reconditioning device that has a filter compacting and positioning means built into the device that can be used in a variety of filtering applications without interfering with the filtering processes. Another specific object is the provision of an improved device in which the filter is easily replaceable without the use of special tools and the like and which a new filter can be compacted without the use of special tools. Other objects will appear from a more detailed description of the invention which follows.

SUMMARY OF THE INVENTION

An improved reconditioning device in accord with this invention includes an elongated housing having a smooth internal surface and an open top and a closed bottom and upper and lower chambers, with an inlet communicating with the lower chamber closely adjacent the bottom thereof. At least one compressible filter substantially fills the lower chamber after compression thereof. An inlet communicates through the housing adjacent the bottom for introducing contaminated oil directly into the filter. A hollow convex frustoconical element is provided in the upper chamber and includes lower and upper surfaces with the latter surface being formed by a plurality of tiers to permit filtered oil to flow therethrough and to cascade from the upper tier to the lower tier where liquid contaminants in the filtered oil are vaporized. An outlet communicates through the housing adjacent the lower tier of the element for removing reconditioned oil therefrom. A removable lid covers the open top of the housing and adjustable means are rigidly attached to the housing adjacent the open top to releasably secure the lid to the housing. The element includes a plurality of upstanding columns formed integrally with a lower tier and each having an upper surface which is engaged by a lower surface portion of the lid so that when the adjustable means apply a downward compressible force onto the lid, such force is transmitted through the columns of the element to its lower surface which transmits such force to fully compress the filter.

Aspects of the invention relate to providing a conduit adjacent the bottom terminating generally in a nozzle located within a cavity of the filter and spaced above the bottom. The nozzle includes a plurality of spaced ports directed laterally to cause the contaminated oil to be discharged laterally within the cavity. The filter is supported by the conduit above the bottom and an outlet located generally between the conduit and the bottom is valved to drain off water and debris which may be collected therein.

Other aspects are seen wherein said adjustable means includes a plurality of spaced elongated bolts welded to the outer surface of the housing adjacent the open top and the bolts have threads along the upper end portions extending above the open top. The lid includes a plurality of openings aligned with corresponding bolts and a plurality of nuts respectively threaded on the bolts for forcibly engaging and urging the lid downwardly to compress the filter when the lid engages the open top of the housing. The bolts extend above the open top to a predetermined distance to accommodate the lid within the openings thereof and extend thereabove while the filter is in its uncompressed state and permit the nuts to be partially threaded thereon. Preferably, there should be at least three equally spaced bolts and at least three equally spaced columns. Furthermore, the lower surface of the element is defined by a perforated plate which permits oil to flow therethrough and thence through the upper surface of the element with the perforated plate providing generally uniform compressive force to the filter.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE PREFERRED EMBODIMENT

Figure 1:
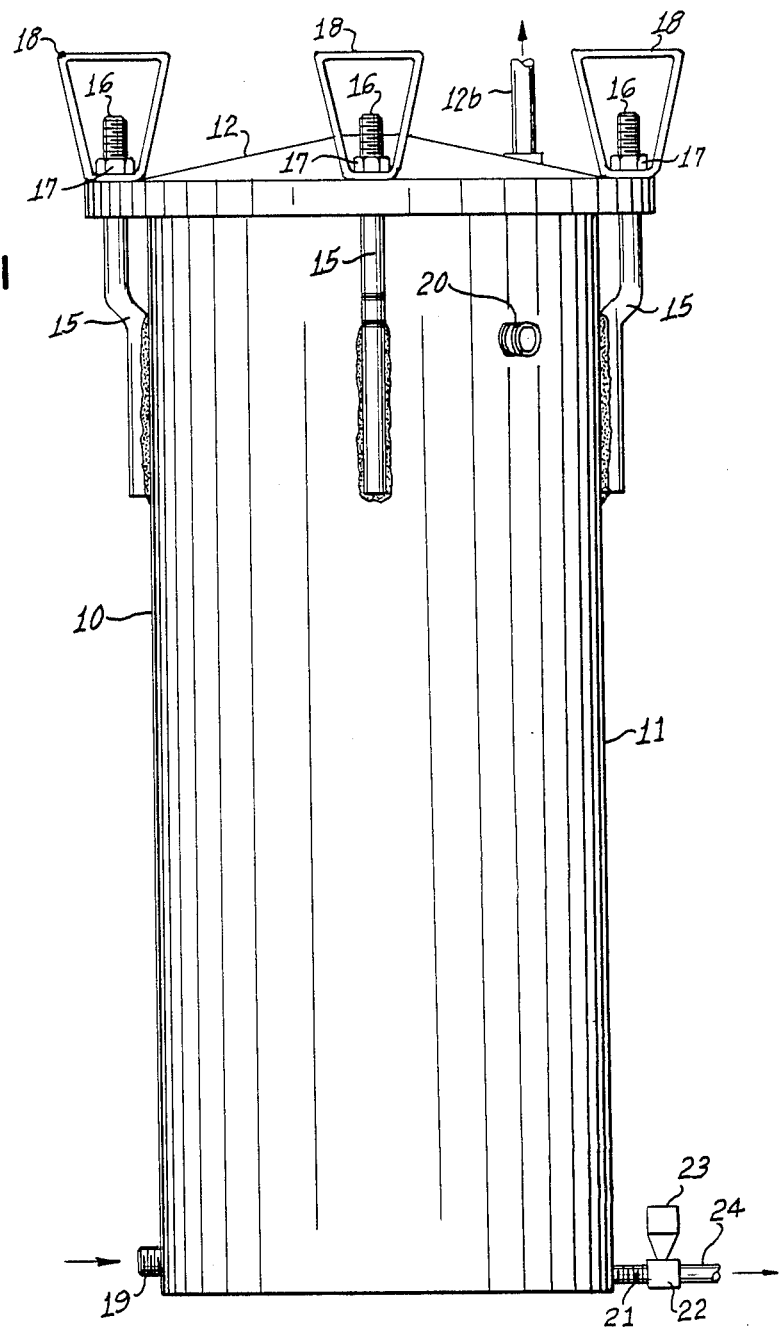
FIG. 1 is an elevational view of the oil reconditioning device in accord with the invention.
Figure 4:
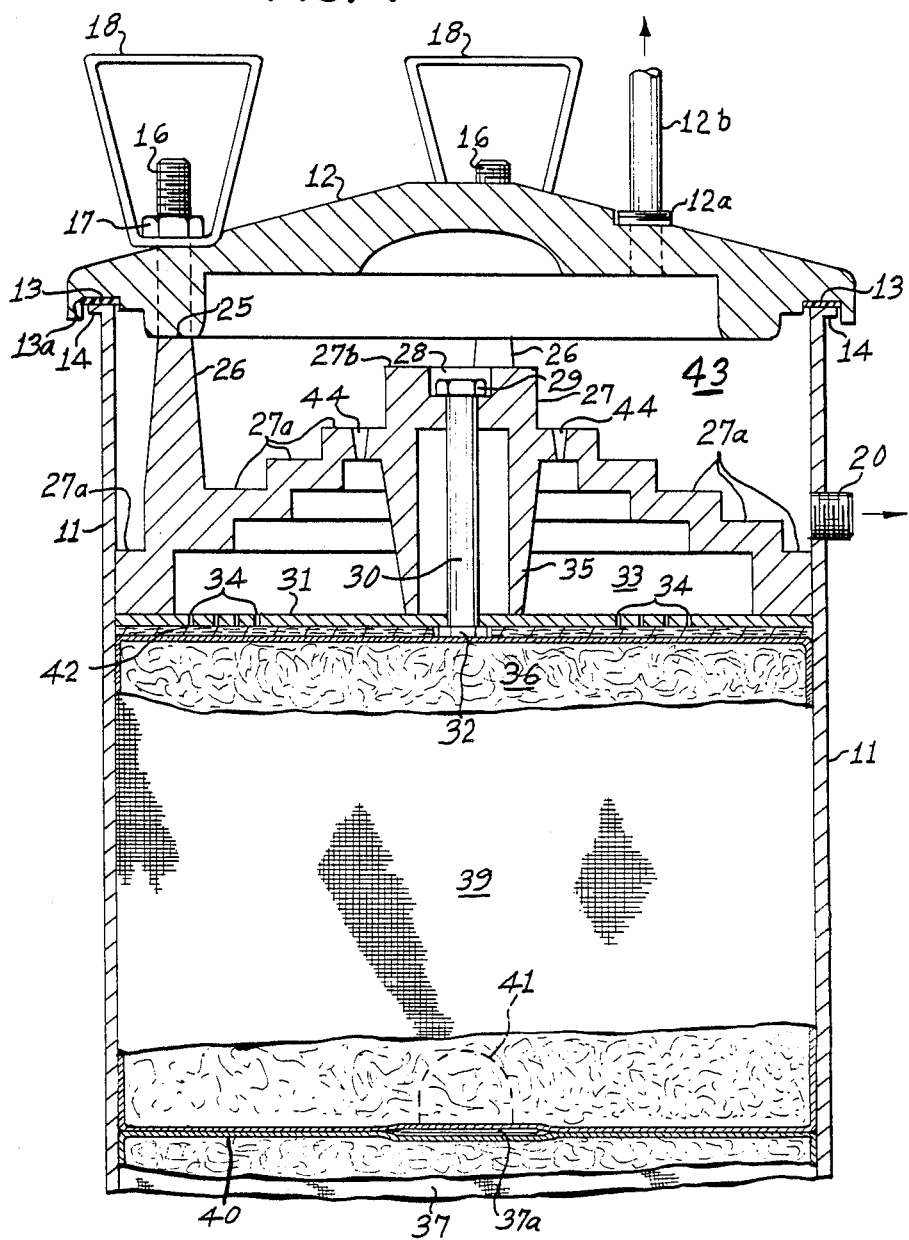
FIG. 4 is a partial cross sectional view of the upper portion of the oil reconditioning device.

Referring now to the drawings, the improved oil reconditioning device 10 is generally shown in FIG. 1 and includes a generally cylindrical housing 11 in the form of an open top container to which a lid 12 is releasably secured. The lid 12 has a channel 13 which extends around the periphery and which rests on a lip 14 of housing 11 (FIG. 4). A gasket 13a is used in the space between housing lip 14 and channel 13 for secure sealing of the device 10 by lid 12. Elongated bolts 15 are located equally spaced about and welded to the exterior surface of housing 11 and have upper threaded portions 16 extending well above the upper end of housing 11. The bolts 15 fir through respective spaced holes 15a in lid 12 where they are engaged by nuts 17. The nuts 17 are shown suitably welded to handles 18 to form large wing nuts for ease of use thereof.

In the preferred embodiment of the present invention four bolts 15 are used which are spaced 90° apart, and at least three are needed to insure proper sealing of the lid with the housing. This arrangement is used to secure lid 12 to the housing 11 without any tilting or warpage of the lid 12 while providing sufficient force upon the nuts 17 when they are tightened in a "staggered" fashion. Lid 12 is generally dome-shaped with a fitting 12a to which a vent or exhaust line 12b can be attached if desired. The vent line 12b is used to remove gaseous impurities such as water vapor from purified oil.

As will be discussed in more detail below, there are three connections to the housing 11 in addition to the vent fitting 12a; An oil inlet 19 by which contaminated oil enters the device 10; a purified oil outlet 20; and a water outlet 21 having a valve 22 operated by handle 23 to control water flow through drain line 24.

Referring now to the cross sectional view of the upper portion of the device 10 illustrated in FIG. 4, the inside lower surface of lid 12 is formed to provide a circular ring-like lower surface portion 25 which rests on four upstanding columns 26 which are formed integrally with convex hollow frustoconical element 27. Frustoconical element 27 includes an upper surface formed into a series of concentric tiers 27a (also see FIG. 3) extending downwardly and outwardly from the center tier 27b. Center tier 27b has a recessed slot 28 into which fits nut 29 for engaging threaded bolt 30. A circular dispersion plate 31 extends across the internal dimensions of housing 11 and is secured to frustoconical element 27 by bolt head 32. Oil enters the interior space 33 between dispersion plate 31 and element 27 by way of a plurality of spaced passages 34. Hollow cylindrical column 35 provides structural support for the upper surface of element 27 and for the center portion of plate 31.

Figure 2:
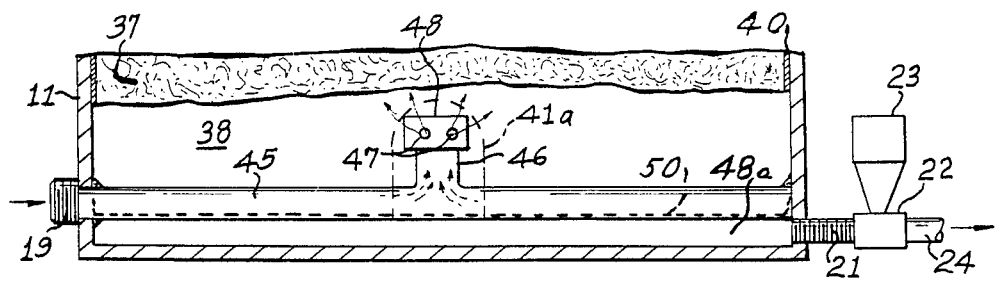
FIG. 2 is an enlarged partial cross sectional view of the lower portion of the oil reconditioning device.

Depending on the size, the device may contain two identical oil filters 36, 37 which are stacked in the lower filter chamber 38 (also see FIG. 2). The filters 36, 37 consist of cotton or similar material placed in sock-like coverings or wrappings 39, 40 respectively, and have an axial cylindrical inlet cavity 41, and 41a, respectively, adjacent the lower ends of the filters. Filter 37 has a small flexible handle 37a which is compressed downward when the filters 36, 37 are compacted by downward pressure via dispersion plate 31. Filter 36 has an identical handle which is not shown for simplicity of illustration. Felt pad 42 rests upon the top of filter 36 between it and dispersion plate 31 and assists in evenly applying pressure to filter 36 while inhibiting contact between dispersion plate 31 and filter coverings 39, 40.

Oil flows into evaporation chamber 43 via holes 44 located on the tier below center tier 27b. The holes 44 have increasing diameter with increasing vertical distance through the upper surface of element 27 and function to provide even flow of oil to cascade down the various tiers.

Referring now to FIG. 2, the partial cross sectional view of the lower portion of the oil reconditioning device 10 illustrates the oil inlet system to the filter chamber 38. Oil enters via inlet connection 19 into conduit 45. Upstanding conduit 46 has spaced ports 47 in nozzle 48. Oil flows out of ports 47 at right angles to the spout 46 and thus is forced laterally into filter 37. Because of the compressive forces applied downwardly when the lid 12 is secured, the filter 37 will be forced downwardly on pipe 45 but generally not in engagement with the bottom of the housing, as generally shown by broken lines 50 in FIG. 2. Water may collect in space 48a where it can be drained via outlet connection 21 to water outlet line 24. Valve 22 is opened and closed via handle 23. In actual practice, space 48a will be quite small depending upon the compressibility of the material in filter 37 and its covering 40.

Figure 3:
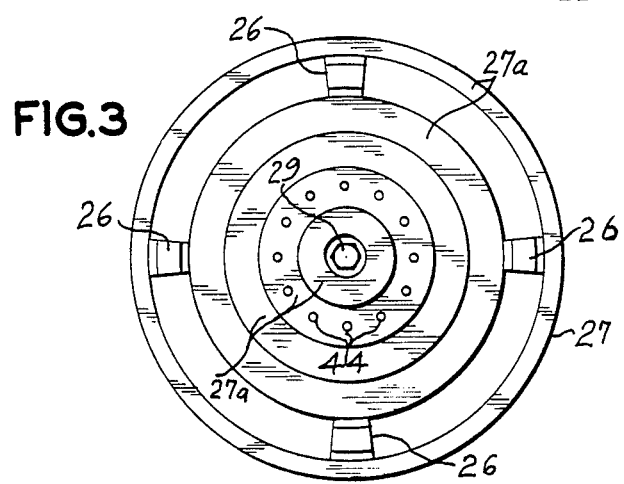
FIG. 3 is a top view of the convex frustoconical element used in the present invention.

In operation, oil flows into inlet 19 and enters the filter 37 by way of the cylindrical cavity 41a through lateral holes 47. After the oil passes through the filters 36, 37 it passes through felt pad 42 and into the interior space 33 via dispersion plate passages 34. The oil then passes through oil passages 44 in the upper tier 27a and then cascades downwardly and outwardly over the other tiers 27a of frustoconical element 27. While the oil, now free of solid contaminants, is in the evaporation chamber 43, water vapor may be removed via vent 12b. The purified oil then flows out of the oil reconditioning device 10 via outlet 20. Often the oil is quite hot and water vapor from the oil is released. However, if the oil is not sufficiently hot, an external heater may be employed prior to the inlet 19, or heated lids may be employed as shown in FIG. 3 of U.S. Pat. No. 4,338,189, for example.

Bolts 15 are used to secure the lid 12 against the housing 11 at the channel 13 and lip 14. The upstanding columns 26 are sized to make contact with the interior ring-like surface portion 25 of lid 12 so that sufficient compression force against the filters 36, 37 is provided to expand them laterally against the inside wall of housing 11 and to more firmly compact such filters. Because the upstanding columns 26 are slightly inboard of the perimeter of frustoconical element 27, downward pressure against the filters 36, 37 via dispersion plate 31 will be more evenly distributed.

The changing of filters 36, 37 and felt pad 42 is easily accomplished by unscrewing wing nuts 17 and lifting the lid 12. Frustoconical element 27, pre-assembled with dispersion plate 31 via bolt 30 and nut 29, is easily removed as a unit vertically upwardly without any rotation required. The use of a ring-like surface 25 makes misalignment with upstanding columns 26 impossible when replacing the lid. Preferably, the upstanding columns 26 are aligned with bolts 15 when the lid 12 is tightened down although this procedure is not absolutely necessary.

The housing 11 may be elongated as illustrated with the internal space being subdivided for purposes of discussion into an upper chamber containing element 27 and a lower chamber containing filters 36, 37. Preferably the interior surface of the housing 11 is smooth and continuous to eliminate sources of damage to filters 36, 37 and to facilitate their easy removal and replacement.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to be secured by Letters Patent of the United States is:

1. An oil reconditioning device comprising an elongated housing having a smooth internal surface and an open top and upper and lower chambers, at least one compressible filter substantially filling said lower chamber after compression thereof, an inlet communicating through said housing adjacent the bottom of said lower chamber for introducing contaminated oil directly into said filter, a hollow convex frustoconical element in said upper chamber and having a lower surface and an upper surface formed by a plurality of tiers having openings to permit filtered oil to flow upwardly through the upper surface and cascade from the upper tier to the lower tier where liquid contaminants in the filtered oil are vaporized, an outlet communicating through said housing adjacent the lower tier of said element in said upper chamber for removing reconditioned oil therefrom, a removable lid covering said open top of said housing, adjustable means rigidly attached to said housing adjacent said open top to releasably secure said lid to said housing, said element including a plurality of upstanding columns formed integrally with a lower tier and each having an upper surface, said lid having a lower surface portion engaging each of said upper surfaces of said columns, said adjustable means arranged to apply a downward compressible force onto said lid which force is transmitted through a communication of said columns of said element to its said lower surface which is positioned to transmit such force to fully compress said filter.

2. In the device of claim 1 wherein said filter includes a cavity in its lower surface, said device further including a conduit adjacent said bottom of said housing terminating generally in a nozzle located within said cavity and spaced above said bottom of said housing.

3. In the device of claim 2 wherein said nozzle includes a plurality of spaced ports directed laterally to cause the contaminated oil to be discharged laterally within said cavity of said filter.

4. In the device of claim 1 wherein said adjustable means includes a plurality of spaced elongated bolts welded to the outer surface of said housing adjacent said open top, said bolts having threaded upper end portions extending above said open top, said lid having a plurality of openings aligned with corresponding said bolts and a plurality of nuts respectively threaded on said bolts for forcibly engaging and urging said lid downwardly to compress said filter when said lid engages said open top of said housing.

5. In the device of claim 4 wherein said bolts extend above said open top to a predetermined distance to accommodate said lid within said openings thereof and extend thereabove while said filter is in its uncompressed state and permit said nuts to be partially threaded thereon.

6. In the device of claim 5 wherein said bolts include at least three equally spaced bolts.

7. In the device of claim 6 wherein said columns include at least three equally spaced columns.

8. In the device of claim 1 wherein said lower surface of said element is defined by a perforated plate which permits oil to flow therethrough and thence through said upper surface of said element, said perforated plate providing generally uniform compressive force to said filter.

9. In the device of claim 1 wherein said filter includes a cavity in its lower surface generally centrally thereof, said device including a horizontal conduit supported above said bottom of said housing, a vertical conduit extending into said cavity and communicating with said horizontal conduit, said horizontal conduit feeding contaminated oil from said inlet to said vertical conduit.

10. In the device of claim 9 further comprising a nozzle attached to the upper end of said vertical conduit.

11. In the device of claim 10 wherein said nozzle includes a plurality of spaced ports for directing the contaminated oil laterally into said cavity.

12. In the device of claim 9 wherein said filter is supported by said horizontal conduit above said bottom of said housing, said device further including an outlet generally between said horizontal conduit and said bottom of said housing to drain off water and debris which may be collected therein.

13. An oil reconditioning device comprising a housing with an open top and a chamber having an upper portion and a lower portion, at least one compressible filter substantially filling said lower portion of said chamber after compression thereof, an inlet communicating through said housing adjacent the bottom of said lower portion of said chamber for introducing contaminated oil directly into said filter, a frustoconical element in said upper portion of said chamber and having an upper surface formed by a plurality of tiers having openings to permit filtered oil to flow upwardly through said upper surface and to cascade from the upper tier to the lower tier where liquid contaminants in the filter oil are vaporized, an outlet communicating through said housing adjacent the lower tier of said element in said upper portion of said chamber for removing reconditioned oil therefrom, a removable lid covering said open top of said housing, adjustable means rigidly attached to said housing adjacent said open top to releasably secure said lid to said housing, said element including a plurality of upstanding columns formed intergrally with a lower tier and each having an upper surface, said lid having a lower surface portion engaging each of said upper surfaces of said columns, said adjustable means arranged to apply a downward compressible force onto said lid which force is transmitted through a communication of said columns of said element which is positioned to transmit such force to fully compress said filter.

14. An oil reconditioning device comprising an elongated housing having a smooth internal surface and an open top and upper and lower chambers, at least one compressible filter substantially filling said lower chamber after compression thereof, an inlet communicating through said housing adjacent the bottom of said lower chamber for introducing contaminated oil directly into said filter, a frustoconical element in said upper chamber and having an upper surface with an opening to permit filtered oil to flow therethrough and to cascade from an upper portion to a lower portion where liquid contaminants in the filtered oil are vaporized, an outlet communicating through said housing adjacent the lower portion of said element in said upper chamber for removing reconditioned oil therefrom, a removable lid covering said open top of said housing, adjustable means rigidly attached to said housing adjacent said open top to releasably secure said lid to said housing, said element including a plurality of upstanding columns formed integrally with a lower portion thereof and each having an upper surface, said lid having a lower surface portion engaging each of said upper surfaces of said columns, said adjustable means arranged to apply a downward compressible force onto said lid which force is transmitted through a communication of said columns of said element to its lower surface which is positioned to transmit such force to fully compress said filter.

15. In the device of claim 14 wherein said filter includes a cavity in its lower surface, said device further including a conduit adjacent said bottom of said housing terminating generally in a nozzle located within said cavity and spaced above said bottom of said housing, said nozzle including a plurality of spaced ports directed laterally to cause the contaminated oil to be discharged laterally within said cavity of said filter.

16. In the device of claim 14 wherein said adjustable means includes a plurality of spaced elongated bolts welded to the outer surface of said housing adjacent said open top, said bolts having threaded upper end portions extending above said open top, said lid having a plurality of openings aligned with corresponding said bolts and a plurality of nuts respectively threaded on said bolts for forcibly engaging and urging said lid downwardly to compress said filter when said lid engages said open top of said housing, said bolts extending above said open top to a predetermined distance to accommodate said lid within said openings thereof and extend thereabove while said filter is in its uncompressed state and permit said nuts to be partially threaded thereon.

17. In the device of claim 14 wherein said filter includes a cavity in its lower surface generally centrally thereof, said device including a horizontal conduit supported above said bottom of said housing, a vertical conduit extending into said cavity and communicating with said horizontal conduit, said horizontal conduit feeding contaminated oil from said inlet to said vertical conduit.

18. In the device of claim 17 further comprising a nozzle attached to the upper end of said vertical conduit.

19. In the device of claim 18 wherein said nozzle includes a plurality of spaced ports for directing the contaminated oil laterally into said cavity.

20. In the device of claim 17 wherein said filter is supported by said horizontal conduit above said bottom of said housing, said device further including an outlet generally between said horizontal conduit and said bottom of said housing to drain off water and debris which may be collected therein.

* * * * *